US008098296B2

(12) United States Patent
Nozawa

(10) Patent No.: US 8,098,296 B2
(45) Date of Patent: Jan. 17, 2012

(54) IMAGE DISPLAY SYSTEM

(75) Inventor: Tomoyuki Nozawa, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 586 days.

(21) Appl. No.: 11/826,620

(22) Filed: Jul. 17, 2007

(65) Prior Publication Data

US 2008/0018773 A1 Jan. 24, 2008

(30) Foreign Application Priority Data

Jul. 18, 2006 (JP) ................. 2006-196248

(51) Int. Cl.
*H04N 5/76* (2006.01)
*H04N 5/222* (2006.01)
*G06F 13/00* (2006.01)

(52) U.S. Cl. .................. 348/231.2; 348/333.05; 725/39
(58) Field of Classification Search .................. 348/231, 348/2, 231.8, 333.05; 725/38, 39
See application file for complete search history.

(56) References Cited

U.S. PATENT DOCUMENTS

| | | | |
|---|---|---|---|
| 6,538,698 B1* | 3/2003 | Anderson | 348/333.05 |
| 6,618,082 B1* | 9/2003 | Hayashi et al. | 348/231.99 |
| 7,035,804 B2* | 4/2006 | Saindon et al. | 704/271 |
| 2003/0063198 A1* | 4/2003 | Yokokawa | 348/231.2 |
| 2004/0169742 A1* | 9/2004 | Shibutani et al. | 348/231.5 |
| 2004/0261103 A1 | 12/2004 | Ohno et al. | |
| 2006/0192881 A1* | 8/2006 | Sato et al. | 348/333.05 |
| 2008/0178217 A1 | 7/2008 | Ohno et al. | |

FOREIGN PATENT DOCUMENTS

| | | |
|---|---|---|
| CN | 1573673 | 2/2005 |
| JP | H11-018044 | 1/1991 |
| JP | 3177483 | 1/1999 |
| JP | 3360595 | 8/1999 |
| JP | H11-282855 | 10/1999 |
| JP | 2001-160951 | 6/2001 |
| JP | 2003-271117 | 9/2003 |
| JP | 2004-072257 | 3/2004 |
| JP | 2005-064637 | 3/2005 |
| JP | 2006-352361 | 12/2006 |
| JP | 2007-053744 | 3/2007 |

OTHER PUBLICATIONS

China First Office Action 2007101386697 dated Apr. 17, 2009 w/ English Translation (9 pages).

* cited by examiner

*Primary Examiner* — Trung Diep
(74) *Attorney, Agent, or Firm* — Dickstein Shapiro LLP

(57) ABSTRACT

An image display system, including a display unit, a memory device configured to memorize a plurality of image data, and a mode switching device configured to set a one coma-reproduction mode and a division-reproduction mode selectively, and a display part provided in the display unit, the display part being configured to display at a time one image datum memorized in the memory device when the mode switching device is in the one coma-reproduction mode, and a plurality of image data memorized in the memory device when the mode switching device is in the division-reproduction mode, at a time, and the display part being configured to display at a time a plurality of image data in accordance with a predetermined condition in the division-reproduction mode.

10 Claims, 12 Drawing Sheets

FIG. 3

| FILE NAME | ATTRIBUTE | APPOINTED AREA | PREPARATION/ UPDATE TIME | PREPARATION/ UPDATE DATE | FAT INITIATION NUMBER | FILE SIZE |
|---|---|---|---|---|---|---|
| RIMG0001.JPG | | | | | | |
| RIMG0002.JPG | | | | | | |
| RIMG0003.JPG | | | | | | |
| RIMG0004.JPG | | | | | | |
| ...... | | | | | | |

204

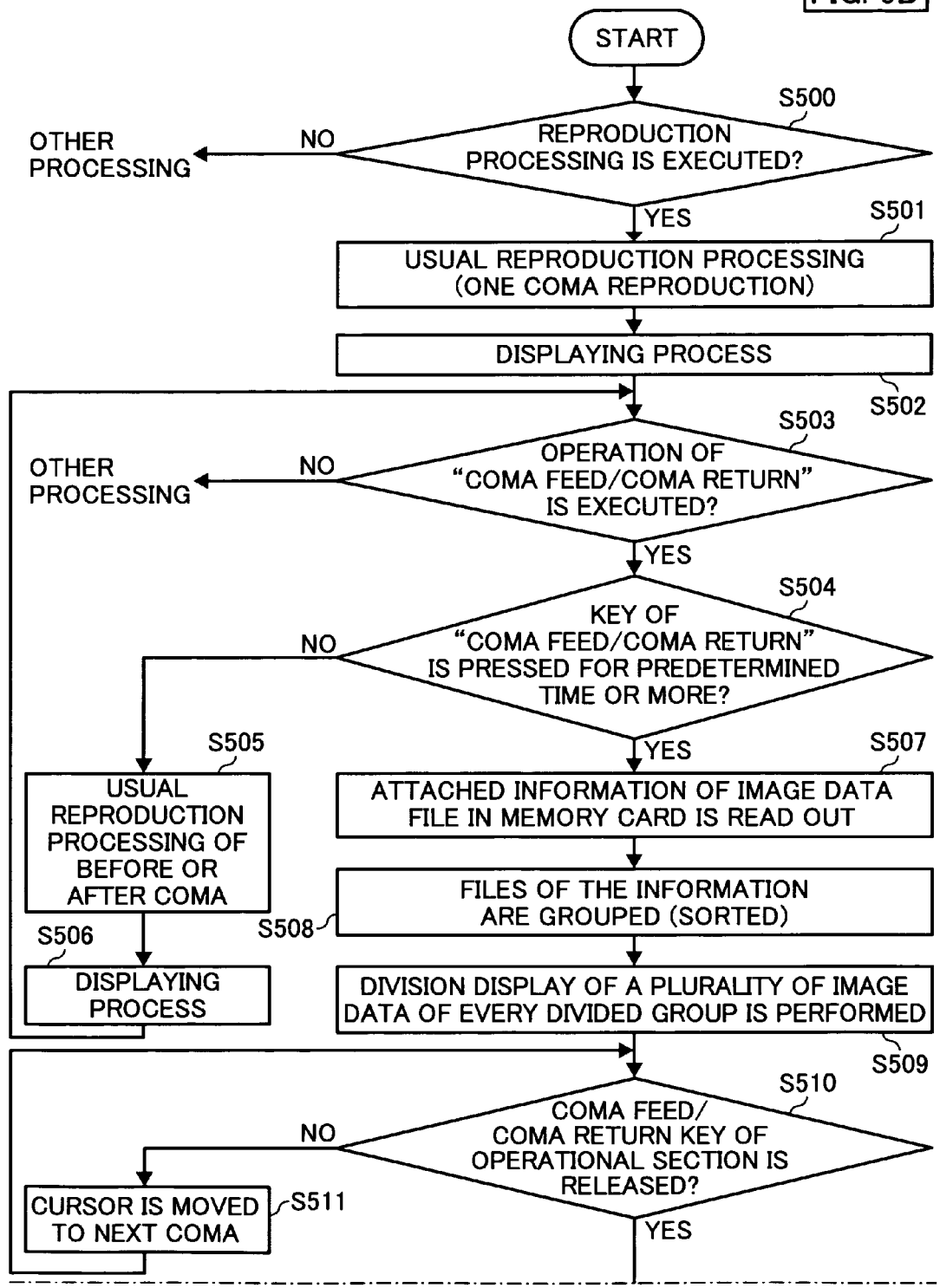

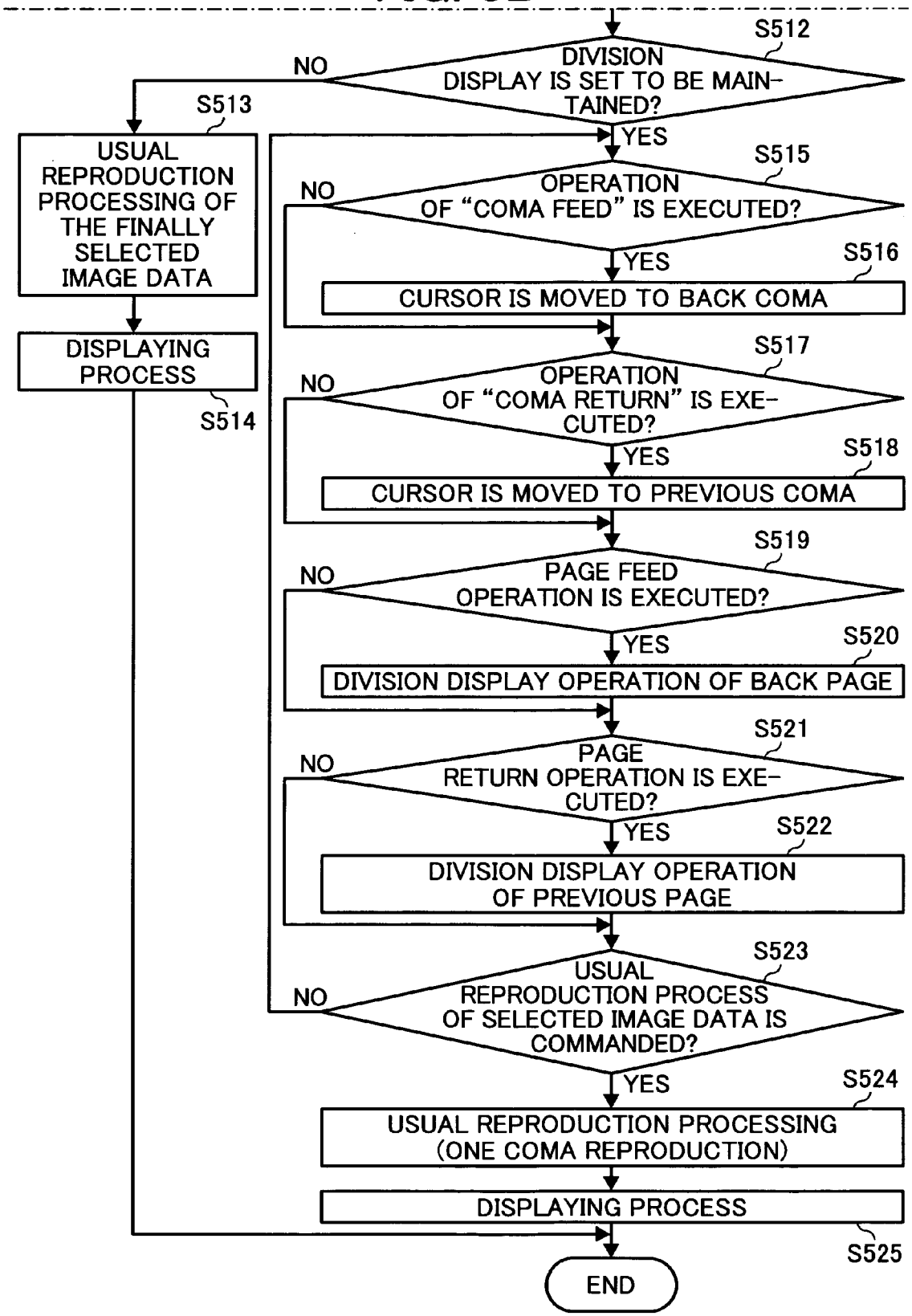

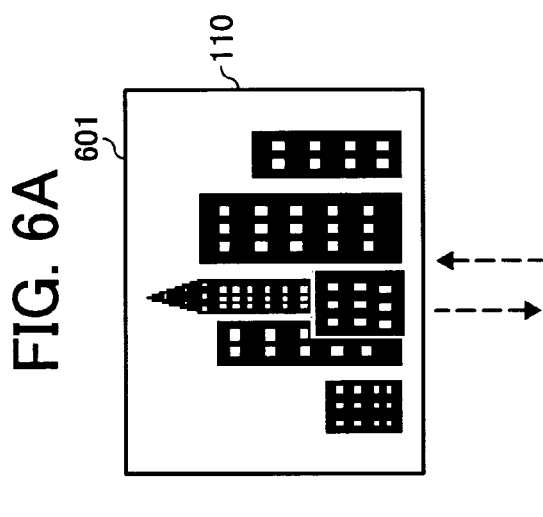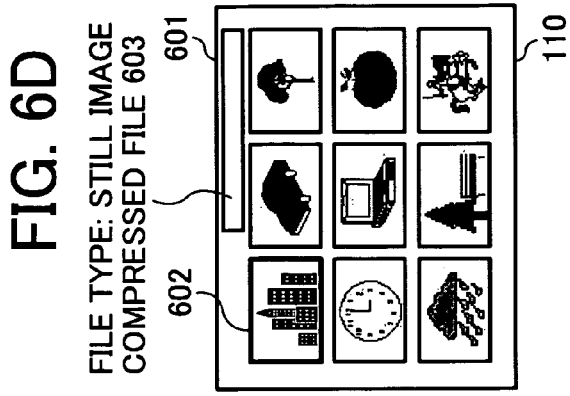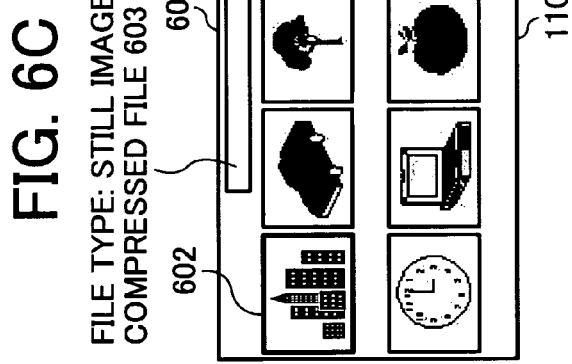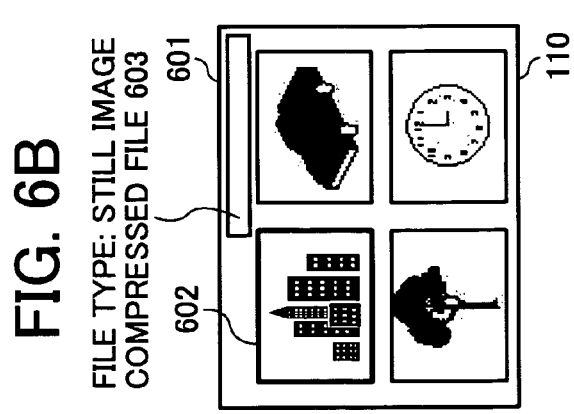

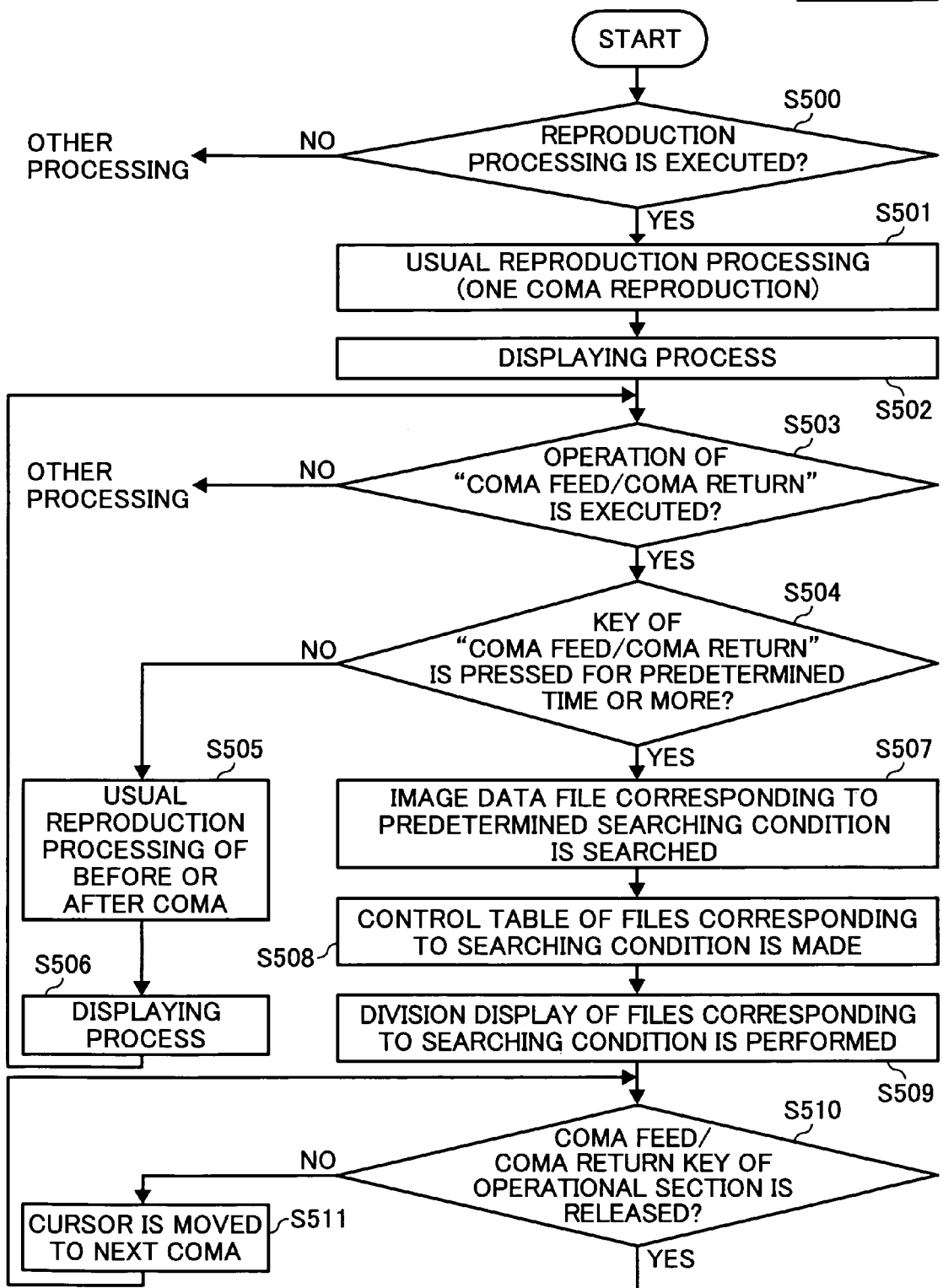

FIG. 11
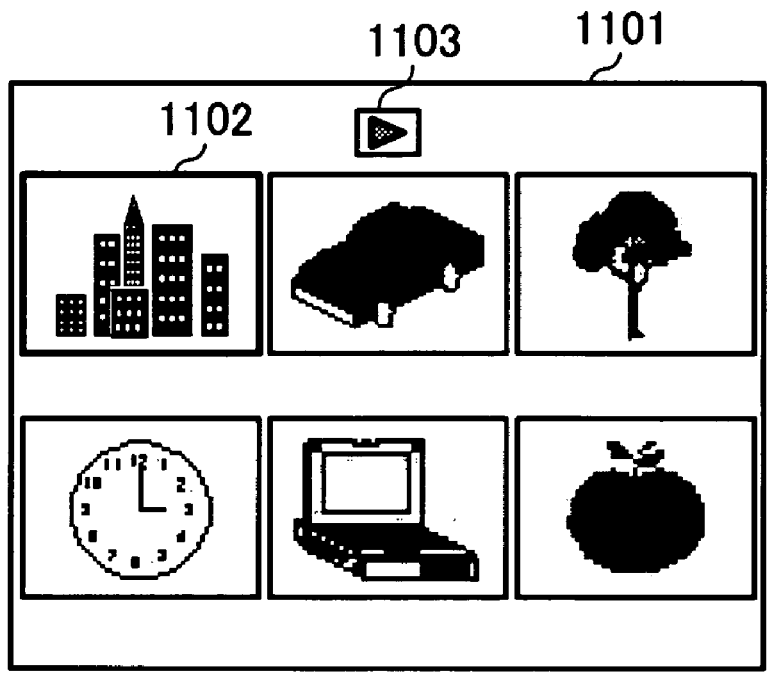
(EXAMPLE OF ICON TYPE)
 : USUAL STILL IMAGE FILE
 : MOVING FILE
 : AUDIO FILE
 : STILL IMAGE FILE WITH AUDIO

EXAMPLE OF EXTENSION TYPE

| .JPG | : JPEG COMPRESSED IMAGE |
| .JPG+.WAV | : STILL IMAGE WITH AUDIO |
| .AVI | : MOVING IMAGE |
| .WAV | : AUDIO FILE |
| .TIF | : NON-COMPRESSED IMAGE |

IMAGE DISPLAY SYSTEM

CROSS-REFERENCE TO THE RELATED APPLICATION

This application is based on and claims the priority benefit of Japanese Patent Application No. 2006-196248, filed on Jul. 18, 2006, the disclosure of which is incorporated herein by reference in its entirety.

BACKGROUND OF THE INVENTION

1. Field of the Invention

The present invention relates to an image display system configured to display at a time a plurality of image data selected from a plurality of image data memorized in a memory device in accordance with a predetermined condition.

2. Description of Related Art

In recent years, there has been widely used a digital camera including an image pickup device such as a CCD (charge coupled device) configured to image a subject and convert a subject image imaged on the CCD into digital image data, and a record medium such as a memory card or the like configured to record the digital image data. A digital camera having high functionality and high performance has been developed. In the digital camera, there is known a technology having a structure in which not only image data of a still image, but also a still image with audio data, audio data, moving image data and so on can be recorded in a record medium such as a memory card or the like and these data are recorded in the same record medium in a mode selection selectively.

On the other hand, the number of file capable of recording in the record medium increases with a large capacity of the record medium, and therefore a great deal of troubles to select a file requested by a user from a great number of files are required.

A conventional photographic device such as a digital camera is configured to reproduce and display a plurality of image data, reproduce and display the image data sequentially by coma feed/coma return function when the image data are searched and confirmed, and search and confirm desired image data. For example, in Japanese Patent Application Publication No. 11-18044, a thumbnail image is enlarged and the enlarged thumbnail image is reproduced in accordance with a state of a command button for image reproduction, in a continuous reproduction mode. On the other hand, an original image is reproduced in a usual reproduction mode.

In the technology disclosed in Japanese Patent Application Publication No. 11-18044 as mentioned, if the image data are continuously reproduced, although update frequency of the reproduced image can be reduced, there is a problem that complex work to search desired image data is required as the number of image data capable of displaying increases, because only one image can be displayed on one screen if the image data are searched.

SUMMARY OF THE INVENTION

An object of the present invention is to provide an image display system capable of displaying at a time a plurality of desired image data conforming to a predetermined condition and confirming the plurality of image data at a time.

To accomplish the above object, an image display system according to one embodiment of the present invention includes a display unit, a memory device configured to memorize a plurality of image data, a mode switching device configured to set one coma-reproduction mode and a division-reproduction mode selectively, and a display part provided in the display unit.

The display part is configured to display at a time one image datum memorized in the memory device when the mode switching device is in the one coma-reproduction mode, and a plurality of image data memorized in the memory device when the mode switching device is in the division-reproduction mode, at a time.

The display part is configured to display at a time a plurality of image data in accordance with a predetermined condition in the division-reproduction mode.

BRIEF DESCRIPTION OF THE DRAWINGS

FIG. 3 is an explanatory view showing one example of a structure of data stored in a directory entry area.

FIG. 5 is a flowchart of processes which are executed by the digital camera device.

FIG. 6A to 6D are an explanatory view of one coma reproduction mode and a division reproduction mode of division in each of four, six and nine parts.

FIG. 11 is a schematically view in which a file type of a presently displaying image file is displayed by an icon.

DETAILED DESCRIPTION OF THE PREFERRED EMBODIMENTS

Preferred embodiments of the present invention will be explained in detail with reference to the accompanying drawings below.

Figure 1:
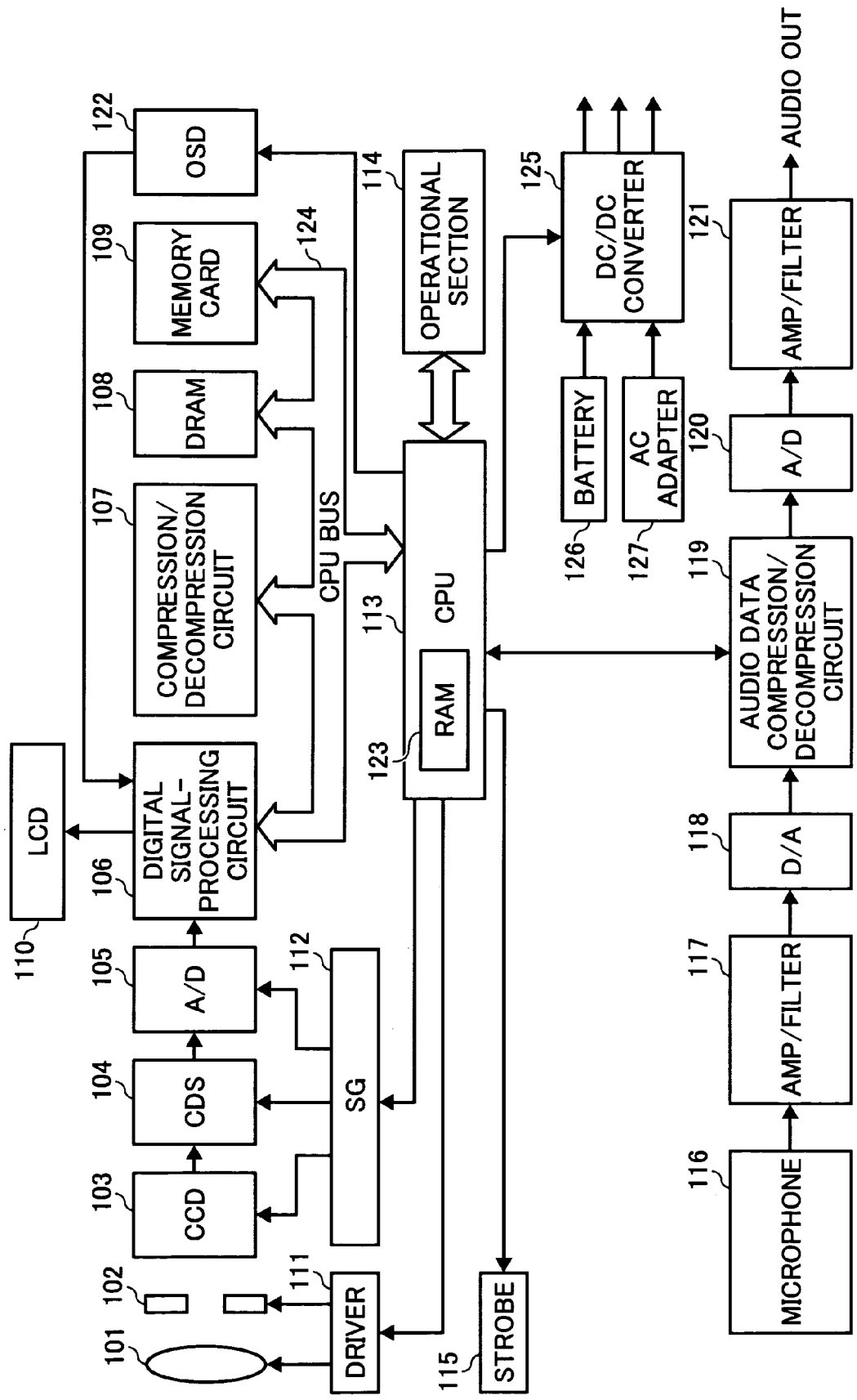
FIG. 1 is a block view showing an electric connection of a digital camera device for which an image display system according to one embodiment of the present invention is applied.

FIG. 1 illustrates an embodiment in which an image display system according to the present invention is applied for a digital camera apparatus.

Figure 2:
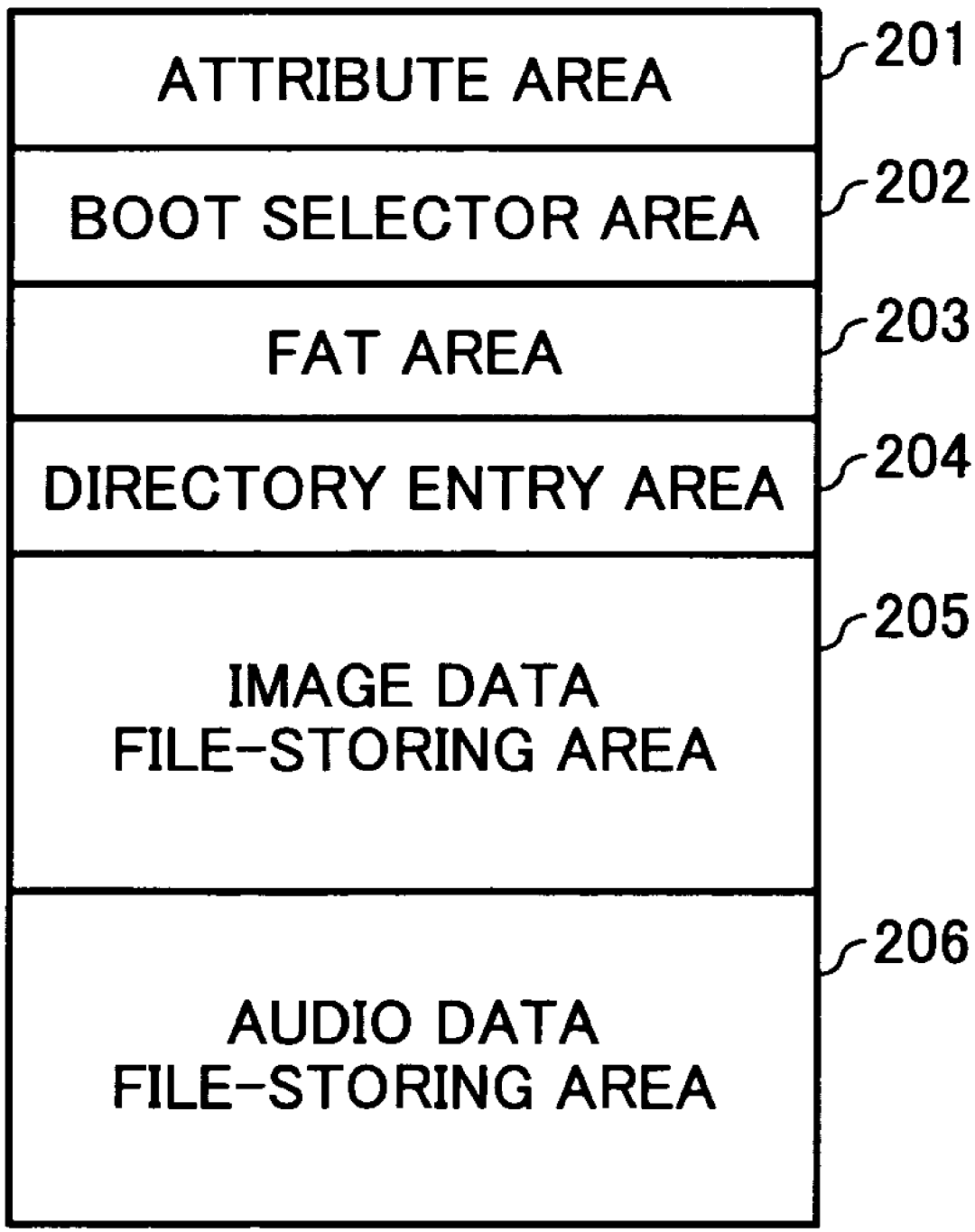
FIG. 2 is an explanatory view showing one example of a format of a memory card.

The image display system includes a display unit 110 and a memory device 109 to memorize a plurality of image data, as shown in FIG. 2. The display unit 110 is connected to a digital signal-processing circuit 106 (mentioned hereinafter) which is connected through a CPU-BUS 124 to a CPU (central processing unit) 113.

The memory device 109 comprises, for example, a memory card which is connected through the CPU-BUS 124 to the CPU 113. The CPU 113 includes a mode switching device which is programmed and configured to set one coma-reproduction mode and a division-reproduction mode selectively.

The display unit 110 includes a display part (mentioned hereinafter) which is configured to display at a time one image datum memorized in the memory device 109 when the mode switching device is in the one coma-reproduction mode, and a plurality of image data memorized in the memory device 109 when the mode switching device is in the division-reproduction mode, at a time.

The display part displays a plurality of image date in accordance with a predetermined condition in the division-production mode.

As shown in FIG. 1, the digital camera apparatus includes a lens unit having a lens 101 and a mechanical section 102 provided with an auto-focus (AF) mechanism, an aperture stop and a filter part, a CCD (charge-coupled device) 103, a CDS (correlated double sampling) circuit. The digital camera apparatus also includes an A/D converter 105, the digital signal-processing circuit 106, a compression/decompression circuit 107, a DRAM (dynamic RAM) 108, the memory card 109, the display unit 110, for example, an LCD (liquid crystal display), a driver 111, an SG (signal generator) 112, the CPU 113, an operational section 114 having a reproduction button, a strobe 115, a microphone 116, an AMP/FILTER 117, a D/A converter 118, an audio data compression/decompression circuit 119, an A/D converter 120, an AMP/FILTER 121, an OSD (operational sequence diagram) 122, a DC/DC converter 125 which is a power source device, a battery 126 and an AC adapter 127.

The CPU 113 includes a RAM 123 and is connected through the CPUBUS 124 to the digital signal-processing circuit 106, the compression/decompression circuit 107, the DRAM 108 and the memory card 109. The OSD 122 is connected to the CPU 113 and the digital signal-processing circuit 106.

The mechanical section 102 includes a mechanical shutter (not shown) which is configured to expose two fields simultaneously. The CCD 103 converts an image picked up through the lens unit into an electric signal or analog image data. The CDS circuit 104 reduces noise of the electric signal output from the CCD 103. The A/D converter 105 converts the analog image data input from the CCD 103 through the CDS circuit 104 into digital image data. In other words, an output signal of the CCD 103 is converted into a digital signal with an optimum sampling frequency (for example, integral multiple of sub-carrier frequency of NTSC signal) by the A/D converter 105 through the CDS circuit 104.

The digital signal-processing circuit 106 is configured to divide the image data input from the A/D converter 105 in brightness data and color difference data and perform a data processing to various processes, correction and image compression/decompression. The image compression/decompression circuit 107 conforms to JPEG and compresses the image data by performing orthogonal transform and Huffman coding to the image data. The image compression/decompression circuit 107 decompresses the image data by performing Huffman decoding and inverted orthogonal transform.

On the other hand, audio is converted into an electric signal by an audio-electric signal conversion element such as the microphone 116 or the like to form audio data, and amplified by the AMP/FILTER 117 to be cut off to become a required band, thereafter, converted into digital audio data with a sampling frequency of two times or more of a predetermined band by the D/A converter 118.

Furthermore, the digital audio data is compressed and code-processed by the audio data compression/decompression circuit 119.

The DRAM 108 temporally stores the compressed image data. The compressed image data is recorded in the memory card 109 as an image data file, and the compressed audio data is recorded in the memory card 109 as an audio data file.

Images corresponding to the image data recorded in the memory card 109 are displayed on the LCD 110 which is the display device. Displayed on the LCD 110 is a state of the digital camera apparatus as set, for example, a mode, error or the like, which is set.

The operational section 114 includes an operational key or operational button to perform various settings such as a functional selection, a photographic indication and so on, from outside. For example, a "division-display indication" key in which a plurality of image data which are stored in the memory card 109 are arranged in one screen and configured to perform the indication of division display, a cursor key configured to perform cursor display (identification) of one of the image data which is divisionally displayed, a "page feed" key to indicate page feed of the divided screen, a "page return" key to indicate page return of the divided screen, and a "ON/OFF" key to indicate ON/OFF of display of a state or the like of the set digital camera apparatus or the like may be prepared as the operational key.

The CPU 113 intensively controls operation of each of parts of the digital camera apparatus based on a control program stored in a ROM (not shown), depending on indication from the operational section 114 or indication of outside operation such as remote control (not shown) or the like. The CPU 113 controls operation of recording the image data and the audio data into the memory card 109 and operation of reproducing the image data and the audio data stored in the memory card 109.

Meanwhile, the battery 126 and the AC adapter 127 are connected to the DC/DC converter 125 which is a light source device.

FIG. 2 illustrates one example of a format of the memory card 109. The format has the same structure as the MS-DOS format (registered trade mark of Micro Soft Co., Ltd) for a personal computer. The memory card 109, as shown in FIG. 2, includes a kind of devices, access speed, an attribute area 201 in which card attribution-information such as memory capacity or the like is stored, a boot selector area 202, a FAT (file allocation table) area 203, a directory entry area 204, an image data file-storing area 205 in which an image data file is stored, and an audio data file-storing area 206 in which an audio data file is stored.

A parameter, that is to say, a FAT (file allocation table), directory entry or the like necessary to read data from or write into the memory card 109 is recorded in the boot selector area 202.

FAT entry which is information of a state where data of each file are recorded is written in the FAT area 203. Meanwhile, a position on a memory in which the data are recorded is shown by a cluster number which is a writing unit of the data.

FIG. 3 illustrates one example of data stored in the directory entry area 204. As shown in FIG. 3, information about a file name of recorded data, an attribute, an appointed area, a preparation/update time, a preparation/update date, a physical position (FAT initiation number), and a file size of the file is recorded in the directory entry area 204. When the corresponding file name is a data file, a file name including an extension which is one of attribute information of the file is recorded.

Figure 4:
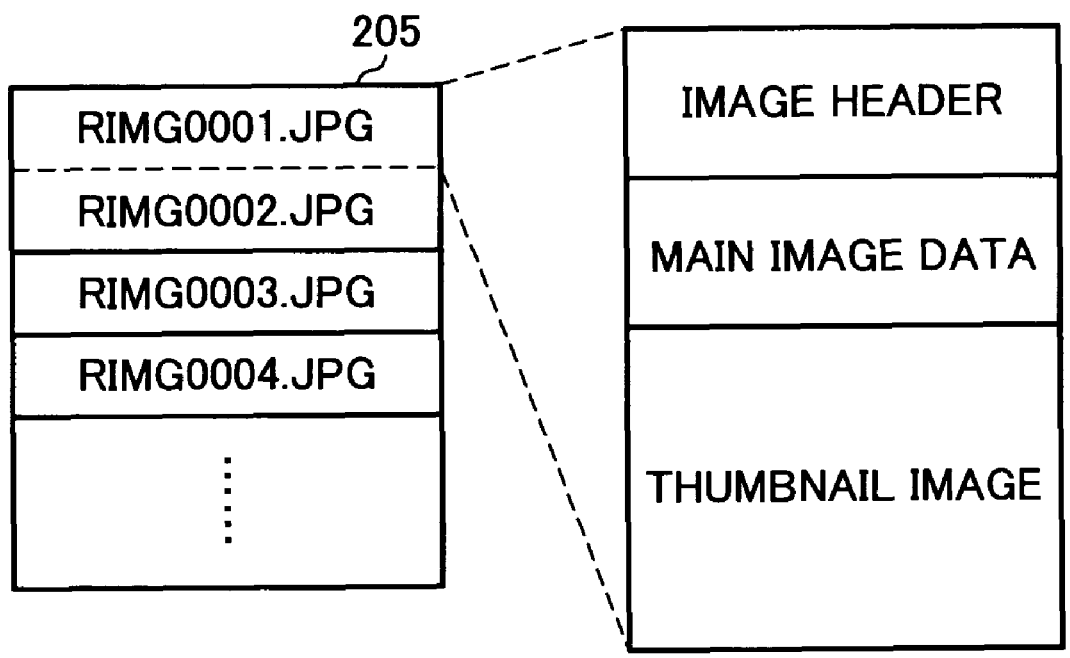
FIG. 4 is an explanatory view showing a structure of an image data file area.

A structure of image data file-storing area 205 is as shown in FIG. 4. The image data files (for example, RIMG0001.JPG, RIMG0002.JPG, RIMG0003.JPG, RIMG0004.JPG, . . . ) are sequentially written in fixed data lengths. Also, each of the image data files comprises an image header, a main image data, and a thumbnail image corresponding to the image data, as shown in FIG. 4. A file attribute, a name of individual standard, a standard version, related information of a body of image data, related information of thumbnail image, a recording mode and so on are recorded in the image header.

Next, operation of recording the image data of the digital camera is explained.

First, a subject image input through the lens 101 is converted into an electric signal by the CCD 103 to form analog image data. Thereafter, the analog image data are input in the A/D converter 105 through the CDS 104 and converted into digital image data. The converted digital image data is signal-processed by the digital signal processing circuit 106 and is stored in the DRAM 108 through the CPU bus 124.

The digital image data stored in the DRAM 108 is input in the compression/decompression circuit 107 through the CPU bus 124, compressed and stored in the DRAM 108 again. The CPU 113 is configured to record the compressed data stored in the DRAM 108 to the memory card 109 through the CPU bus 124 in a predetermined form as the image data file (see FIG. 5). In this case, a part of pixels of the compressed image data is adapted to thin every interval, the prepared thumbnail images are recorded as the identical image data file (see FIG. 5) together.

Next, operation of reproducing the image data of the digital camera is explained.

If an image data file in the memory card 109 to be reproduced by operation of the operational section 114 is designated, compressed image data in the designated image data file are read out and stored in the DRAM 108. The image data stored in the DRAM 108 are input in the compression/decompression circuit 107 through the CPU bus 124 and processed to be decompressed, again stored in the DRAM 108. The stored and decompressed image data in the DRAM 108 are input in the digital signal-processing circuit 106 through the CPU bus 124 and converted into a video signal to be displayed on the LCD 110.

Next, control for the image display is explained.

FIG. 5 illustrates a flow chart for explaining the control. The CPU 113 determines as to whether the reproduction button of the operational section 114 is pressed (S500), if it is pressed (S500Y), usual reproduction processing is executed (S501) so that the decompressed image data are displayed on the LCD 110 (S502). Furthermore, the CPU 113 judges, if the operation of "coma feed/coma return" in the operational section 114 is executed (S503Y), about whether the key of "coma feed/coma return" is pressed for a predetermined time or more (for example, 2 seconds or more) (S504), if the predetermined time does not lapse (S504N), a before or after coma is usually processed to be reproduced (S505), and the decompressed image data are displayed on the LCD 110 (S506).

If a predetermined time lapses (S504Y), attached information of the image data file in the memory card 109 is read out (S507), files of the information are grouped in predetermined conditions (S508). Thereby, it is possible to perform division display which displays a plurality of image data on the LCD 110 every the divided group, at a time and simultaneously (S509).

In this case, the number (divided number) of the image data displaying at a time and simultaneously can be set by a user (for example, 4, 6 and 9 divisions), and the CPU 113 is configured to execute change of the divided number to a set divided number, if the division display is changed (see FIG. 6).

Here, a particular method of the group is explained as follows.

It is considered that a user previously and optionally sets each divided group, for example, by a set up menu.

If the image data are requested to be grouped by the file type, "file type" is set in the group-particular method of "group-search setting menu" in the set up menu. The divided groups are, for example, a still image compressed file, a still image non-compressed file, an audio file, a binary file, a moving image file or the like. If they are displayed, the user can easily confirm by displaying the file type for every group (see reference number 603 in FIG. 6). Furthermore, by setting priority of a file type to be searched to be, for example, still image-moving image-audio, or moving image-audio-still image or the like.

Consequently, if a file of high priority is previously searched, it is possible to accomplish effective division and reproduction of each group.

If a subject is photographed by the digital camera, an image file of a predetermined form is generated, and attached information about the same image file is added to the same image file, usually. It is possible to set one of the attached information to a searching condition to identify the group. In the "group-search setting menu" of the set up menu, certain attached information is set to the group-particular method and the image file corresponding to the set condition is searched. With the above-mentioned structure, it is possible to search the image file corresponding to a predetermined condition. It is also possible for a user to display a predetermined image file only without exfoliating unnecessary image files.

It is preferable that the attached information can be attached to the image file. This attachment can be accomplished by applying various types. For example, the attached information may be described in a header or footer or the like attached around the image file. Although it is preferable that the digital camera may attach the attached information, various methods may be applied to the attachment.

As a concrete example of the attached information, there is information showing an exposure metering scheme, a light source, a flash state or the like, when taking a photograph.

If the exposure metering scheme is set to the particular method of the group, searching is made to information showing an exposure metering scheme when taking a photograph about the image file. When setting the group-particular method by designating "center-weight", "multi-spot", "division" and so on as some exposure metering schemes, it is possible to search and draw an image file for each exposure metering scheme. For example, if the center-weighted exposure metering scheme is set to the group-particular method, only the image file photographed by use of the center-weighted exposure metering scheme can be drawn and displayed.

In case of the digital camera, a photographed image file has generally an Exif type. An Exif format includes a JPEG image data area to store JPEG type-image data and an attached information area to store various attached information relating to the JPEG image data. Attached to the attached information area are various tags inherent to each area which conform to the Exif standards such as a day and time information area, focal distance information area, a shutter speed information area and so on, other than the exposure metering scheme, the light source, the flash state or the like which are mentioned above. An instrument including a digital camera, which processes an image file, reads the above-mentioned tags, thereby it is possible to identify whether any information is stored in each area.

By setting the identifiable attached information to the group-particular method, a user can preferentially display a desired image file by searching an image file corresponding to a set condition.

As another group-particulate method, the same image file as the presently reproducing image file can be set as a searching condition. In this case, for example, an image file corresponding to the same type-image file as the reproducing image file, or the same image file as certain attached information may be searched.

Furthermore, by using dated information of the image file as the group-particular method, an image file photographed on the same day or month as that of the reproducing image file may be searched and displayed.

Figure 10B:
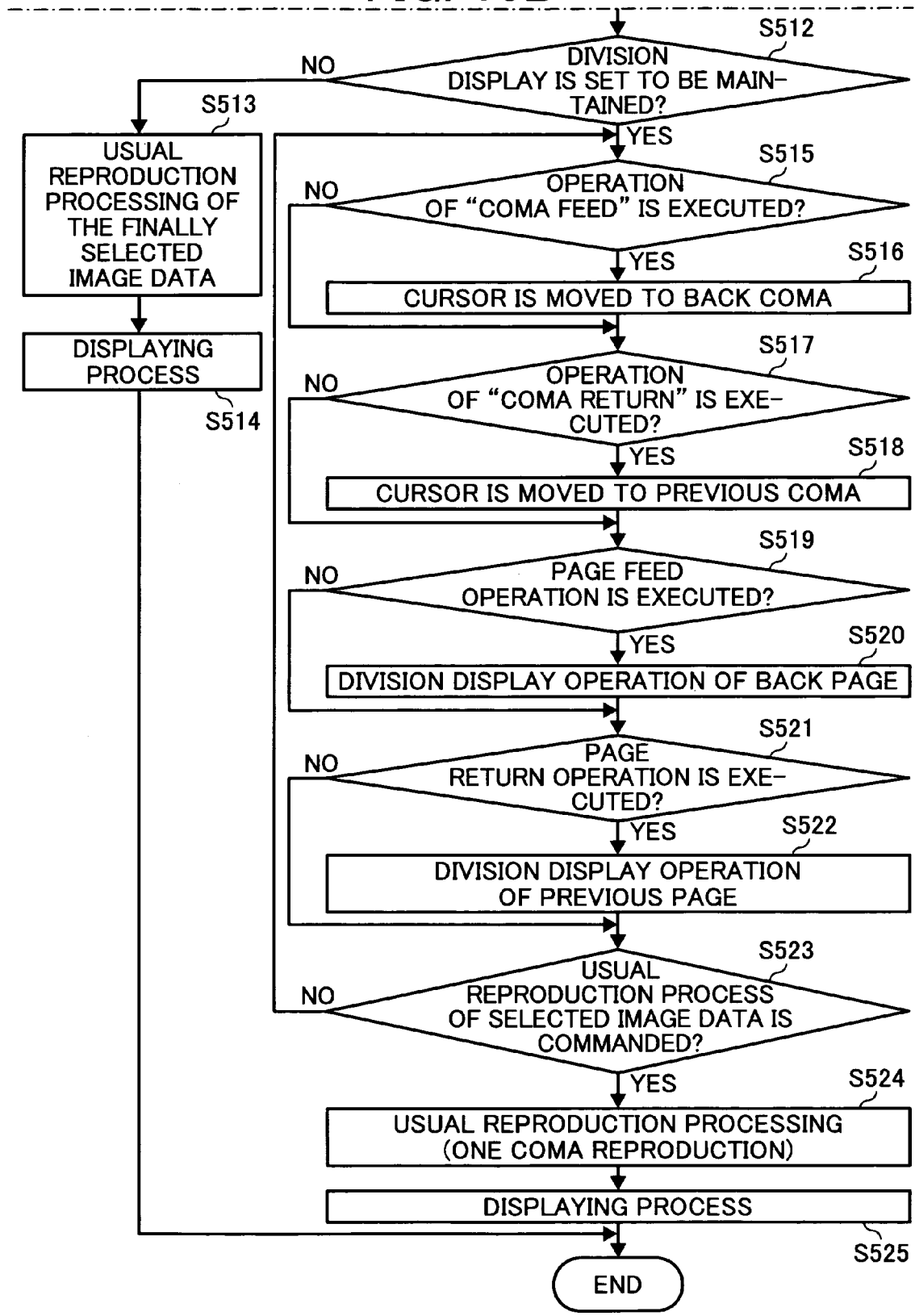
FIG. 10 is another flowchart of processes which are executed by the digital camera device.

Meanwhile, a searching method for the image file will be finally explained by use of a flow chart as shown in FIG. 10.

When the grouped image files are divided and reproduced, a user can easily confirm by displaying on the screen what type of the displayed image file it is. For example, if the grouped image file is a file type, a still image compressed file, moving file, audio file, binary file or the like as the file type photographed by the digital camera is considered. If division and reproduction is made for every file type, by judging the file type of the present displayed image file based on the extension or the like of file name to display the extension itself, or displaying icon corresponding to the file type, a user can easily confirm the type of image file for the displayed group is it.

If the grouped image file is a date, by displaying the date, a structure is adapted such that a user can easily confirm when an image file is photographed.

FIG. 11 illustrates displaying a file type of the presently displaying image file. In FIG. 11, reference number 1103 indicates an icon display showing a file type and a user can easily confirm.

Figure 12:
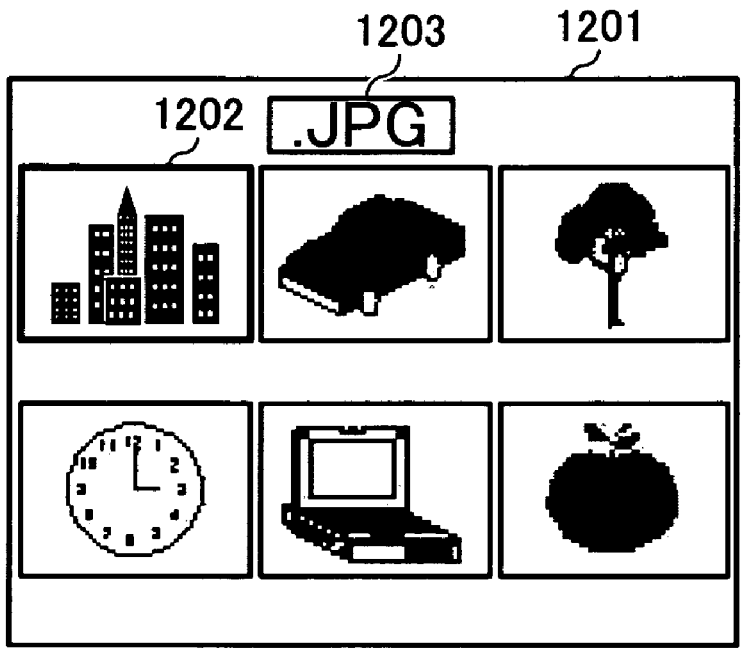
FIG. 12 is a schematically view in which an extension of the presently displaying image file is displayed.

FIG. 12 illustrates schematically an extension of the presently displaying image file. In FIG. 12, reference number 1203 indicates the extension of the image file which can be easily confirmed by a user.

Date and time information as the other "identifiable display" may be used. If the date and time information are set to and displayed on the group-particular method, it is also possible to gain the date and time information from the attached information or the like of the image file, that is to say, to execute, for example, the display of "2006:01:01 00:00:00".

Alternatively, more comprehensively, month information may be displayed. In this case, if an image file which is photographed in April is set to be a predetermined group, of course, the information of the image file photographed in April is acquired from the attached information or the like of the image file, it is also possible to perform the display of "April".

FIG. 6 illustrates one example of division display. Here, FIG. 6A illustrates a displaying example of usual reproduction (one coma reproduction display), FIG. 6B to 6D illustrate a displaying example of division reproduction display in each of "division in four parts", "division in six parts" and "division in nine parts". Reference number 601 shows a display part of the LCD 110, reference number 602 a cursor using to identify and display an image, reference number 603 a file type of the displaying group.

Figure 7:
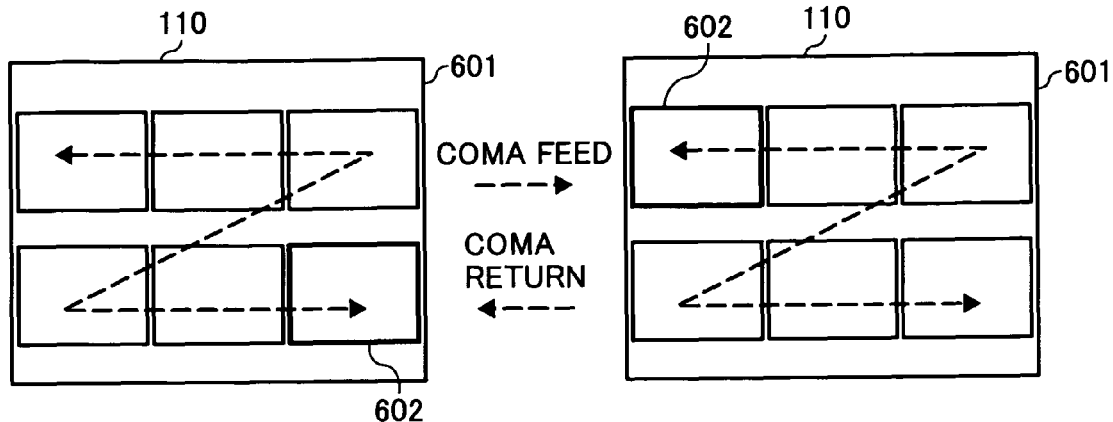
FIG. 7 is an explanatory view of coma feed and coma return.

Returning to FIG. 5, the CPU 113 judges whether the coma feed/coma return key of the operational section 114 is released (S510), if it is not released (S510N), the cursor is sequentially moved to display the identification of selected image data (S511). As shown in FIG. 7, the cursor moves on the above-mentioned display part 601 of the display unit 110 to execute the coma feed and the coma return.

If the "coma feed/coma return key is released (S510Y), the CPU 113 judges whether the division display is set to be maintained even after the coma feed/coma return key is released (S512), if the division display is set to be maintained even after the reproduction button is released (S512Y), the CPU 113 maintains a state of the division display and is prepared to stand by the next command.

In this case, the CPU 113 allows the cursor to identify the image to move to a back coma, if the coma feed key of the operational section 114 is operated (S515Y). If the coma return key is operated (S517Y), the CPU 113 moves the cursor to a before coma (S518). Meanwhile, if a final coma on one page is selected, when the movement of the cursor is commanded by the coma feed key, the division screen of the back page is displayed to display a start coma on that page by the cursor. Also, if a start coma on one page is selected, when the movement of the cursor is commanded by the coma return key, the division screen of the previous page is displayed to display the final coma on that page by cursor (see FIG. 7).

Figure 8:
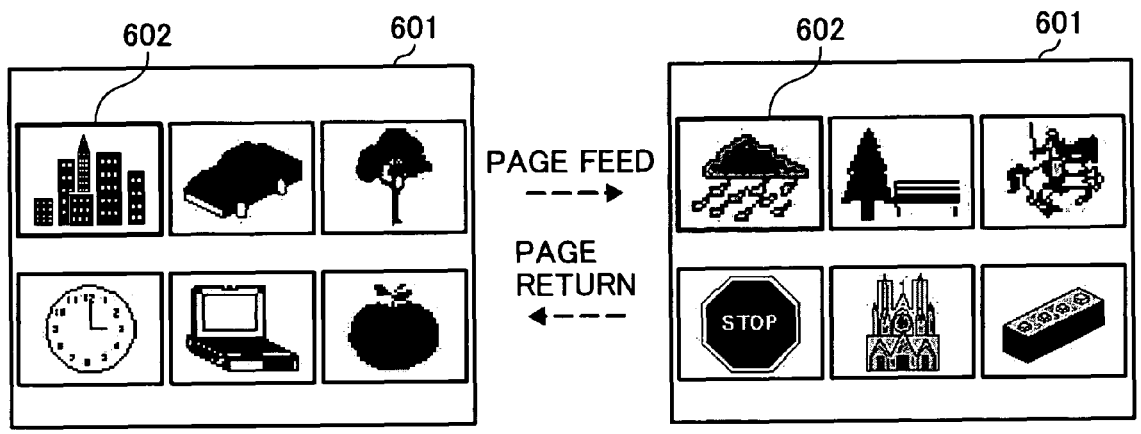
FIG. 8 is an explanatory view of page feed and page return.

Moreover, the CPU 113 is configured to display the division screen of the back page or the group of the back image data (S520), if the page feed key of the operational section 114 is operated (S519Y). If the page return key is operated (S521Y), the CPU 113 displays the division screen of the previous page or the group of the previous image data (S522). Meanwhile, if the final page displayed, when the page feed is commanded by the page feed key, the division screen of the back page is displayed to display a start page. Also, if a start page is displayed, when the page return is commanded by the page return key, the final page is displayed (see FIG. 8).

Furthermore, the CPU 113, if usual reproduction process of image data selected by the cursor 602 is commanded (S523Y), processes the usual reproduction (S524), and displays the processed reproduction on the LCD 114 (S525). On the other hand, if the division display is not set to be maintained after the coma feed/coma return key of the operational section 114 is released (S512N), the CPU 113 processes usual reproduction (one coma reproduction display) of an image corresponding to the finally selected image data (S513, S514).

Finally, one example of each of the coma feed/coma return key and the page feed/page return key of the operational section 114 is explained.

Figure 9:
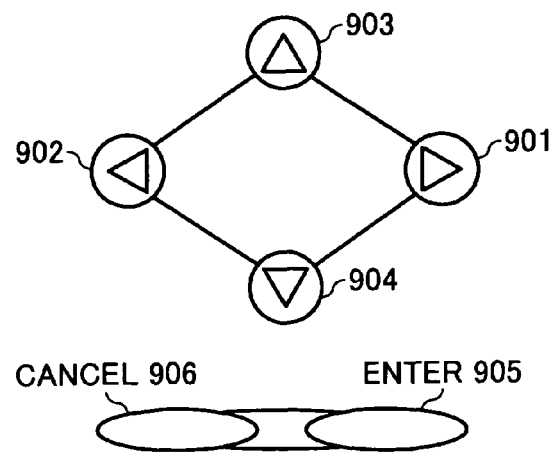
FIG. 9 is a plan view showing an arrangement of keys.

FIG. 9 illustrates a plan view of the keys. As shown in FIG. 9, reference numbers 901, 902, 903 and 904 are attached to a coma feed key, a coma return key, a page feed key and a page return key, respectively, and the above-mentioned operation can be carried out by these keys. In addition, reference number 905 shows an ENTER key. By pressing the ENTER key 905, the image selected by the cursor 602 can be usually reproduced. Reference number 906 shows a "CANCEL" key.

A process illustrated in the flow cart shown in FIG. 10 instead of the above-mentioned process explained referring to FIG. 5 may be executed. The process shown in FIG. 10 differs from that shown in FIG. 5 in the steps S507, S508, and S509. Therefore, a processing content about each of the steps S507, S508, and S509 shown in FIG. 10 is first explained as follows. In the other processing content shown in FIG. 10, the identical reference numbers are attached to the same parts as in FIG. 5. Accordingly, a detailed description of the other processing content is omitted.

That is to say, whether the image data file in the memory card 109 corresponds to a predetermined searching condition is searched (S507), if there is a file having information corresponding to the searching condition, and the file is stored in the RAM 123 by making a control table in which information (for example, a file name, a file number or the like) capable of identifying the file is registered (S508). Whether all files in the memory card 109 correspond to the searching condition is judged, after all the files in the memory card 109 are searched, presence and absence of the information of the control table stored in the RAM 123 are judged.

If there is no information stored in the RAM 123, the fact that the file corresponding to the searching condition does not exist is displayed on the LCD 110. On the other hand, if there is information stored in the RAM 123, only the file corresponding to the searching condition is processed to be divided and reproduced based on the information stored in the RAM 123. Extended image data are divided and displayed on the LCD 110 (S509). Meanwhile, the divided number (for example, division in four parts, six parts and nine parts or the like) can be set by a user, the CPU 113, if the number of the division display is changed, the change of number of division screen with respect to the set divided number is processed (see FIG. 6).

Because the image display system according to the present invention makes it possible to display a plurality of desired image data corresponding to a predetermined condition at a time, it is possible to confirm a plurality of desired image data at a time.

Although the preferred embodiments of the present invention have been mentioned, the present invention is not limited to these embodiments, it should be noted that various changes and modifications can be made to the embodiments.

What is claimed is:

1. An image display system, comprising:
   a display unit;
   a memory device configured to memorize a plurality of image data; and
   a mode switching device configured to set a single-reproduction mode displaying one image datum and a division-reproduction mode displaying a plurality of image data, selectively;
   an image selection device configured to perform selection of the image data of the memory device in the division-reproduction mode; and
   a display part provided in the display unit, the display part being configured to display the one image datum or the plurality of image data of the plurality of image data stored in the memory device,
   wherein the mode switching device is configured to be capable of switching from the division-reproduction mode and the single-reproduction mode depending on selection of the image data by the image selection device,
   wherein the display part is configured to display one image datum stored in the memory device at a time when the mode switching device is in the single-reproduction mode, and a plurality of image data stored in the memory device at a time when the mode switching device is in the division-reproduction mode,
   wherein said image selection device is configured to select image data in the division-reproduction mode in accordance with prioritized predetermined conditions,
   wherein the display part is configured to display a plurality of image data at a time in accordance with said prioritized predetermined conditions in the division-reproduction mode, such that image data is selected by said image selection device in accordance with at least a first one and a second one of said prioritized predetermined conditions, image data selected by said image selection device in accordance with said first one of said prioritized predetermined conditions is displayed by said display part, and then at least image data selected by said image selection device in accordance with said second one of said prioritized predetermined conditions is displayed by said display part, and
   wherein the display part is configured to display image data for groups which are grouped depending on a type of data file, and wherein each of said image data selected by said image selection device in accordance with said first one of said prioritized predetermined conditions is stored in said memory device in a first one of a still image file, a moving images file and an audio file, and wherein each of said image data selected by said image selection device in accordance with said second one of said prioritized predetermined conditions is stored in said memory device in a second one of a still image file, a moving images file and an audio file, different than said first one of a still image file, a moving images file and an audio file.

2. The image display system according to claim 1, wherein the mode switching device includes an operation button, wherein the mode switching device is configured to be switched from the single-reproduction mode to the division-reproduction mode when the operation button is pressed for a predetermined time or more, such that the display part switches from displaying only a single image to displaying a plurality of images, selected in accordance with said predetermined condition, simultaneously in response to the operation button being in the pressed state for said predetermined time.

3. The image display system according to claim 2, wherein the mode switching device is configured to be switched from the division-reproduction mode to the single-reproduction mode when said pressed state of the operation button is released after said predetermined time, and after the mode switching device is switched from the single-reproduction mode to the division-reproduction mode, such that the display part switches to displaying only a single image in response to the release of the operation button.

4. The image display system according to claim 3, further comprising a division display setting device to set number of the image data displayed at a time on one screen of the display unit in the division-reproduction mode.

5. The image display system according to claim 3, wherein the display part is configured to display image data for at least one group searched based on a recorded date as a searching condition.

6. The image display system according to claim 1, wherein the mode switching device is configured to set whether the division-reproduction mode is maintained or the switching device is switched from the division-reproduction mode to the single-reproduction mode, when a pressed state of an operation button is released after the mode switching device is switched from the single-reproduction mode to the division-reproduction mode.

7. The image display system according to claim 1, further comprising a division display setting device to set number of the image data displayed at a time on one screen of the display unit in the division-reproduction mode.

8. The image display system according to claim 1, wherein the display part is configured to display image data for groups which are grouped depending on a recorded date of the data file.

9. The image display system according to claim 1, further comprising an identification display part to perform identifiable display of each group when the division-reproduction mode is selected.

10. The image display system according to claim 1, wherein the prioritized predetermined conditions are set by a sequence of a type of file such as a still image file, a moving images file, or an audio file.

* * * * *